UNITED STATES PATENT OFFICE.

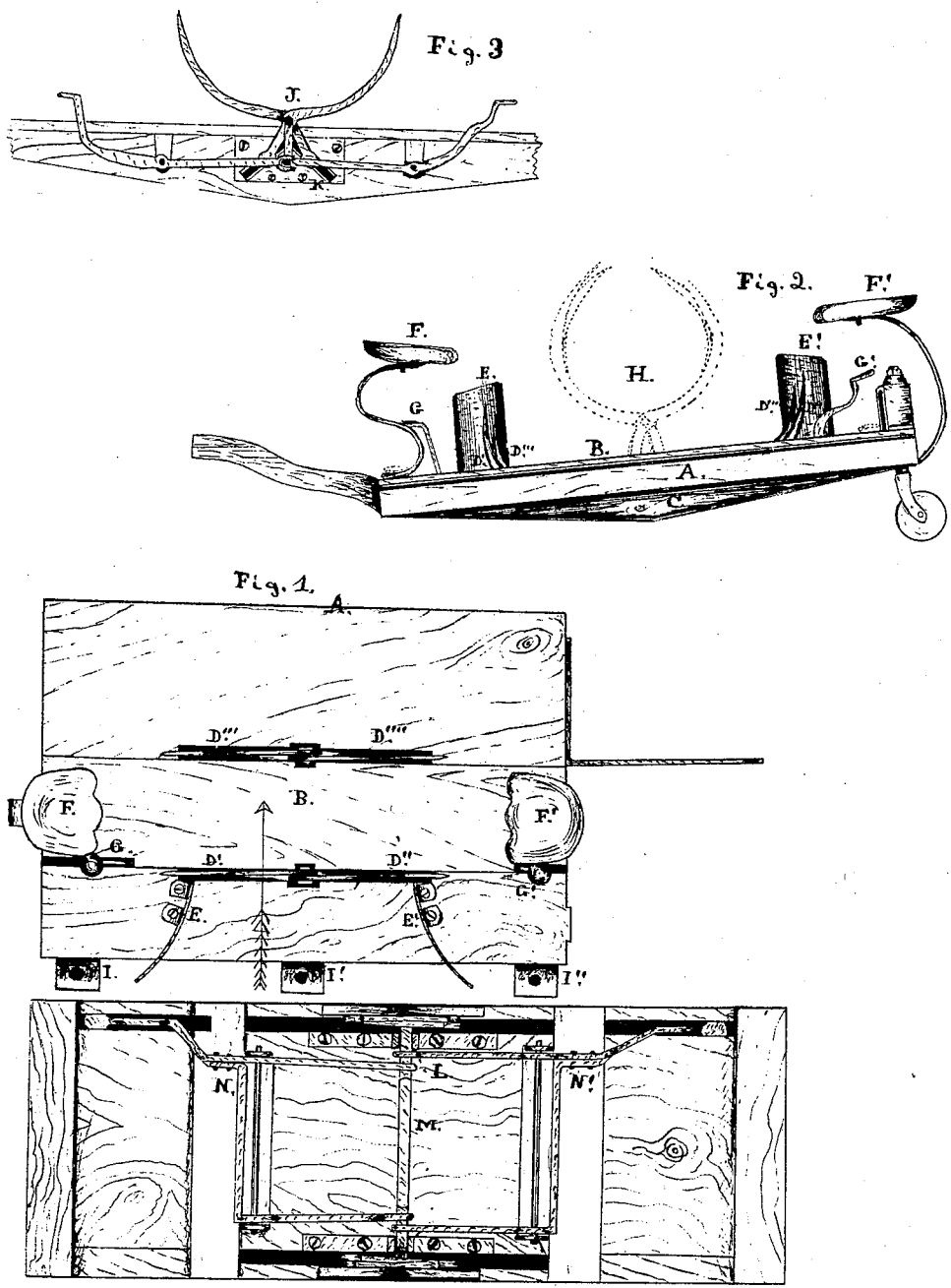

B. W. SQUIRES AND CHARLES M. CLINTON, OF ITHACA, NEW YORK, ASSIGNORS TO SEWELL D. THOMPSON AND DAVID P. GOODHUE, OF SAME PLACE.

IMPROVEMENT IN BINDING ATTACHMENTS FOR HARVESTERS.

Specification forming part of Letters Patent No. 99,256, dated January 25, 1870.

*To all whom it may concern:*

Be it known that we, BENJAMIN W. SQUIRES and CHARLES M. CLINTON, of Ithaca, Tompkins county, New York, have invented an Improved Reaper Binding Attachment, of which the following is a specification:

Our object mainly is to collect the cut grain into bundles, and bind it as fast as the reaper or harvester cuts it. This we accomplish by making a platform or frame, on which two men are seated facing each other, who bind the bundles of grain, which are brought into a space between two sets of clasping-tines, by the rake in use on harvesters. These clasping-tines are, when empty, wide apart, and partially concealed in the platform or frame; but when the grain for a bundle is slid into the open forks by the harvester-rake, the foot of either operator is put on either one of two levers, and thus the tines are closed, and the bundle raised up above the platform, ready to be bound. The construction and arrangement of these several parts will be apparent as we describe them.

Figure 1 is a view looking down on our attachment. Fig. 2 is a side view; Fig. 3, a detached view of the tines, foot-levers, and mechanism that moves the tines. Fig. 4 is a view from below of the frame that connects the sets of tines and of the frame of the foot-levers.

In Fig. 1, A is the back edge of the platform B, and I I' I'' are the clamps by which the attachment is held to the reaper. The grain enters in the direction of the arrow, aided by the guides E E', and comes in between the four tines D' D'' D''' D'''' by the action of the rake in general use on harvesters. As soon as the bundle is lying loosely in the space between the four tines, one or the other of the operators on the seats F F' puts his foot on one of the levers G G' and causes the tines to clasp the bundle, and at the same time raises it from the floor of the platform. As one binds the bundle, the other operator is making his straw band, that at the right instant he has taken from the grain before him. Thus, as one binds and throws the bundle off of the machine, the other is getting ready to bind. At the proper moment the foot is taken off of the lever, and the tines drop in place for the next bundle. And thus, the mechanism works on as long as desired.

In Fig. 2, A is the back edge of the platform B, and C is a space beneath the platform in which the devices for moving the tines are concealed, and D' D'' D''' D'''' are the projecting tines of the clasping arrangement just behind the curved guides E and E', while F and F' are the two seats for the operators, and G G' two foot-levers of the tines. At H the dotted lines show the position of the tines, when the bundle is held for binding, in reach of either operator.

In Fig. 3 the tines of each pair are seen to be pivoted together, and to extend below the pivot to two friction-wheels on their lower ends, which wheels play in inclined grooves in a plate, K. There is also a perpendicular groove, L, which, in a full-sized machine, we design to make in the plate K, but which is represented as made in a separate plate or standard, in which slides a perpendicular stud. This stud is connected at the top with the axis or pivot J of the tines, and at the bottom with the foot-levers of the operators.

Fig. 4 shows the stud-frame M, and that at each end it is connected to each pair of tines at their axis, and thus both ends of the bundle are caught by the tines at the same instant, and elevated to be bound; and Fig. 4 also shows that the levers are connected by a frame, N N', to each set of tines, and thus they move each set, which tines are partially concealed in the platform.

The further uses as well as the advantages of our invention are apparent to those skilled in the art to which it appertains.

We claim—

1. The combination and arrangement of the two pairs of clasping-tines, the two foot-levers moving the tines, and the inclines for the lower ends of the tines, substantially as set forth.

2. The arrangement of the frame at the base of the clasping-tines, fast to the pivots of each pair of tines, whereby two or more pairs of tines are made to act in unison, substantially as set forth.

3. The combination of two or more pairs of tines, the grooved plate K, causing the closing of the tines, the groove L in its plate or standard, guiding the rising of the tines, the tine-frame M, and lever-frames N N', and foot-levers, substantially as described.

4. The combination and arrangement of the platform B, the tines D, and moving appendages K M N L, for the purpose of an attachment to a reaper or harvesting machine, substantially as set forth.

5. The clasping-forks or tines D in or upon a harvester-platform, when, by the described or equivalent moving means, they both clasp and raise the bundle to be bound for the purpose of binding grain, substantially as set forth.

B. W. SQUIRES.
     CHAS. M. CLINTON.

Witnesses:
 SAMUEL J. PARKER,
 A. M. LUCAS.